United States Patent [19]

Honsa et al.

[11] Patent Number: 5,054,562
[45] Date of Patent: Oct. 8, 1991

[54] VIBRATION-ISOLATED POWER TOOL

[75] Inventors: Thomas W. Honsa; Thomas S. Honsa, both of Moline, Ill.

[73] Assignee: Honsa Ergonomic Technologies, Inc., Rock Island, Ill.

[21] Appl. No.: 518,000

[22] Filed: May 2, 1990

[51] Int. Cl.⁵ .............................................. B25D 9/04
[52] U.S. Cl. .................................. 173/139; 173/162.1; 173/162.2; 403/224; 403/225
[58] Field of Search ................... 173/139, 162.1, 162.2; 16/116 R; 81/489; 74/558.5; 267/140.3, 141, 293; 403/224, 225, 362

[56] References Cited

U.S. PATENT DOCUMENTS

| | | | |
|---|---|---|---|
| 728,692 | 5/1903 | Fales | 403/362 |
| 2,725,692 | 12/1955 | Andreae | 403/225 |
| 4,085,832 | 4/1978 | Gaines et al. | 267/293 |
| 4,648,468 | 3/1987 | Honsa | 173/139 |
| 4,771,833 | 9/1988 | Honsa | 173/162.2 |
| 4,871,150 | 10/1989 | Le Salver et al. | 267/140.3 |

Primary Examiner—Mark Rosenbaum
Assistant Examiner—Allan M. Schrock
Attorney, Agent, or Firm—Henderson & Sturm

[57] ABSTRACT

A hand-held power-driven tool for operating a work member in conditions in which fairly extreme vibrations are generated is constructed of rigid parts isolated from each other by elastomer shock-absorbing material arranged between the parts in laminar fashion in which certain of the layers are of different Shore A hardness as respects each other. The layers are also formed with different thicknesses and are introduced into an annular space between the parts in pourable condition, each layer being permitted to set up before the next layer is pourable, resulting in bonding of the elastomer layers to each other as well as to the parts. A novel supporting structure is disposed between the parts to space them in condition to receive the elastomer material and the structure is permitted to remain between the parts in such isolated or shock-absorbing fashion as to improve the vibration-minimizing charactreistics of the overall design.

4 Claims, 3 Drawing Sheets

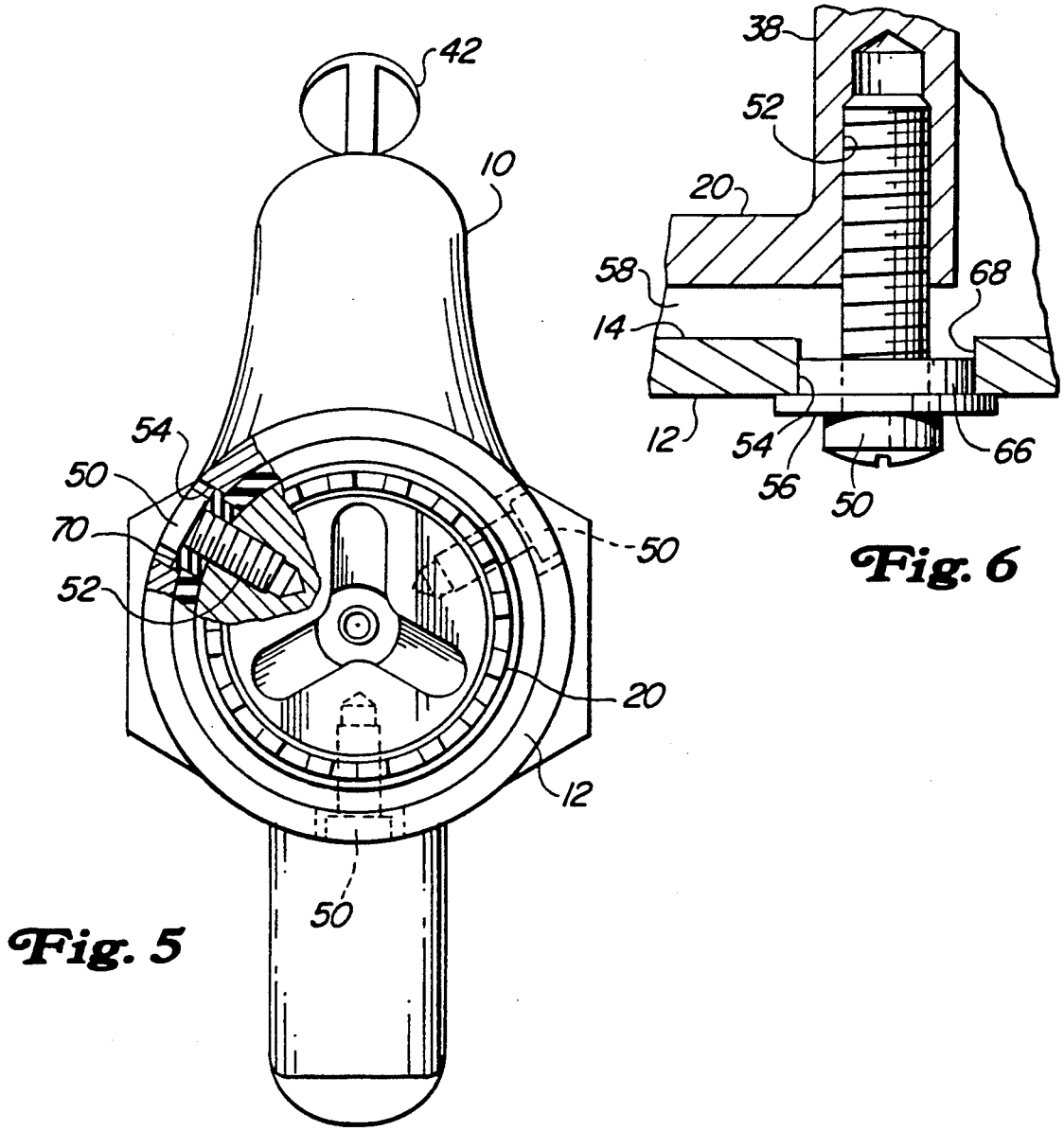

VIBRATION-ISOLATED POWER TOOL

BACKGROUND AND SUMMARY OF THE INVENTION

A basic tool of the general type on which the present invention affords an improvement forms the subject matter of the U.S. Pat. No. 4,771,833 to Thomas S. Honsa. The tool there is of the so-called pistol-grip type having a handle including a forwardly opening barrel within which a cup-like member is disposed in concentric fashion so as to provide annular space between the exterior of the cup and the interior of the barrel, which space is filled with elastomer shock-absorbing material. A significant improvement according to the present invention is that the elastomer material is in laminar form, thus further minimizing tool-generated vibrations and thus further isolating the user from tool-generated forces, all leading to material reduction in operator fatigue, especially from conditions creating carpal tunnel syndrome, the characteristic of which is that tendons passing through the narrow channel in the wrist, called the carpal tunnel, are over-used and press on the median nerve that controls feeling in the hand. The disorder is extremely painful and can be permanent. Other disorders includes "vibration white finger" and Raynaud's phenomena.

A further feature of the invention is the provision of structure for centering the cup within the handle cavity in preparation for the introduction of the elastomer material. In this respect, the structure is such that it can remain within the tool without adverse effects on the operation of the tool. An added feature of the invention is the provision of elastomer and further of different dimensions. In a fluid-powered tool, the invention provides improved internal passage means for communication with external fluid-conducting means.

The foregoing and other features will become apparent as a preferred embodiment of the invention is disclosed in detail in the ensuing specification and accompanying sheets of drawings.

DESCRIPTION OF THE DRAWINGS

FIG. 5 is a front elevation with portions broken away and shown in section.

FIG. 6 is an enlarged fragmentary section showing part of the means for centering the interior cup relative to the outer barrel.

DETAILED DESCRIPTION OF A PREFERRED EMBODIMENT OF THE INVENTION

Figure 1:
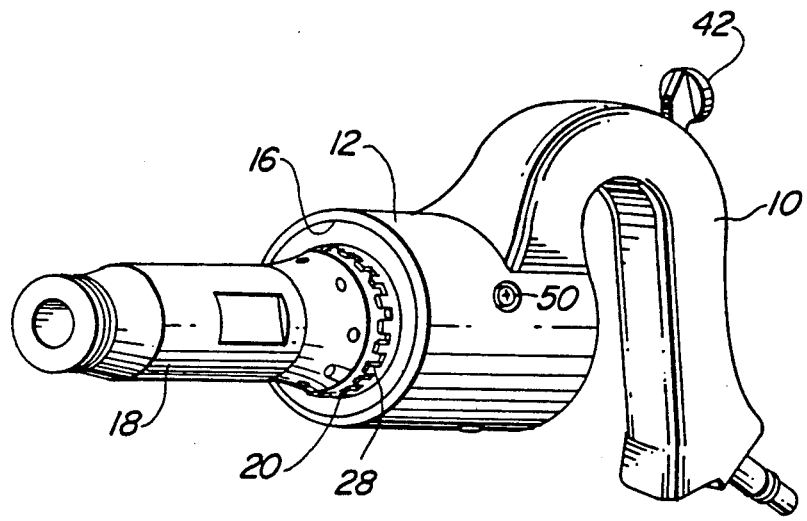
FIG. 1 is a perspective of a representative tool in assembled form.
Figure 2:
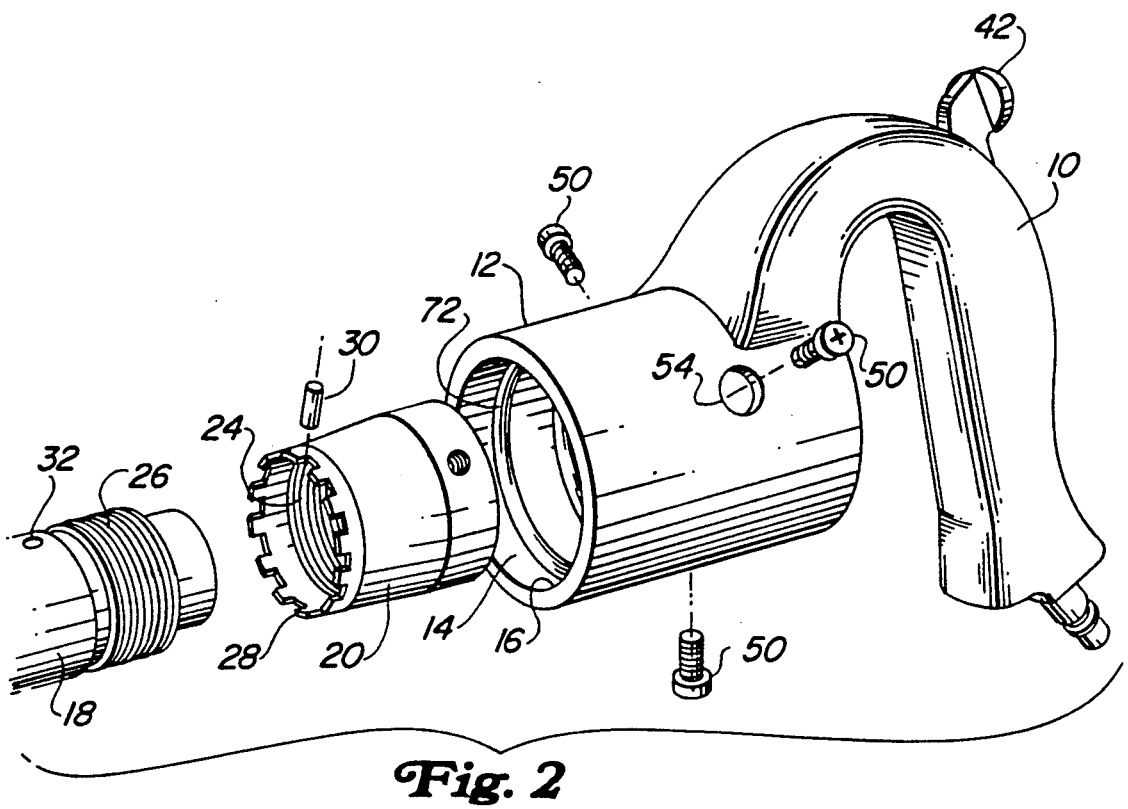
FIG. 2 is an exploded perspective, on a somewhat larger scale, of the tool of FIG. 1.

Reference will be had first to FIGS. 1 and 2 for a general explanation of a representative tool in which the invention finds principal utility. The tool has outer structure of rigid material, e.g., aluminum, but other suitable materials may be used in its design and manufacture. Also, the tool may be air-driven but here again variations are available and this aspect is not a limitation on the scope of the invention.

The tool comprises a handle 10, here of the pistol-grip type by way of illustration only, integrated with a forward cylindrical barrel 12 having a cavity 14 opening forwardly at 16. A work member 18, such as a chipping tool or the like, is a removable part separate from and selectively replaceable in the tool, and normally projects forwardly in fore-and-aft coaxial relation to the barrel 12, as will hereinafter appear.

A cup 20 of smaller outside diameter than the inside diameter of the cavity 14 is disposed within the cavity and fixedly but yieldably or resiliently carried by the barrel by means of the interposition of elastomer vibration-absorbing or isolating material 22 (FIGS. 3 and 4) to be described in detail herein. The cup is interiorly threaded at 24 and the rear end of the work member 18 is externally threaded at 26 for receipt by the cup. The front or rim of the cup has a plurality of angularly spaced notches 28 for selectively receiving a radial pin 30 which enters a complementary bore 32 in the work member 18 after appropriate tightening of the latter into the cup. From the description thus far, it will be seen that vibrations and like forces generated by operation of the work member, although transmitted to the cup, are essentially isolated from the handle 10 via the material 22. Because of the threaded connection at 24-26, the work member 18 can be removed and replaced or other work members suitably threaded can be affixed to the cup without altering the relationship between the cup and barrel 12 and handle 10. In the present disclosure, the work member 18 is air-driven and includes a suitable air-powered means such as motor (not shown) receiving air under pressure via passage means 34 including a fore-and-aft bore 36 through a rear radial wall 38 of the cup 20. The passage means communicates with an air-supply conduit or passage 40 within the handle 10 which carries typical throttle control or valving (not shown) under control of an external handle-carried trigger 42, and the handle is connected to a high-pressure source (not shown), all details that can be widely varied without sacrificing the novel aspects of the invention. A modified form of passage means is shown in FIG. 4 wherein a tube 44 extends into a cavity 46 in the cup rear wall and is sealed to that wall by an air-tight seal 48. The tube of course communicates with the handle passage 40.

The elastomer material 22 utilized as a connection between the cup 20 and the interior of the barrel 12 is of the pourable type that subsequently sets up and forms a bond with surfaces that it contacts, in the present case the interior cylindrical wall of the barrel 12 and the exterior cylindrical surface of the cup 20. The material 22 may be any of the known polyurethane types, pourable at room temperature or above (up to, say 100° F.) which becomes a gel in approximately one minute. To accommodate the introduction of the elastomer material, the cup is initially located—here centered—in the cavity by means of a plurality of rigid interlock elements, here three cap screws 50 arranged radially in angularly spaced apart relation about the common fore-and-aft axis of the cup and barrel (FIGS. 5 and 6). The rear wall of the cup affords a thickness enabling the rear end of the cup to be bored and tapped at 52 for receiving the cap screws, each of which passes through an opening 54 in the wall of the barrel 12, via an elastomer grommet or bushing 56 (FIG. 6) that tightly fits both the associated opening 54 and its cap screw 50. By this means, the cap screws may be adjusted radially to locate the centered position of the cup. Since there are three cap screws, a fixed position of the cup may be easily achieved, it being understood that, during this stage, the work member 18 is removed. At this point, the front of the structure is open in axial register with an annular space 58 (FIG. 6) surrounding the exterior of the cup and defined also by the interior surface of the cavity. The front opening of the annular space appears at 60 in FIG. 4 and may be subsequently filled by an annular elastomer seal 62.

Figure 3:
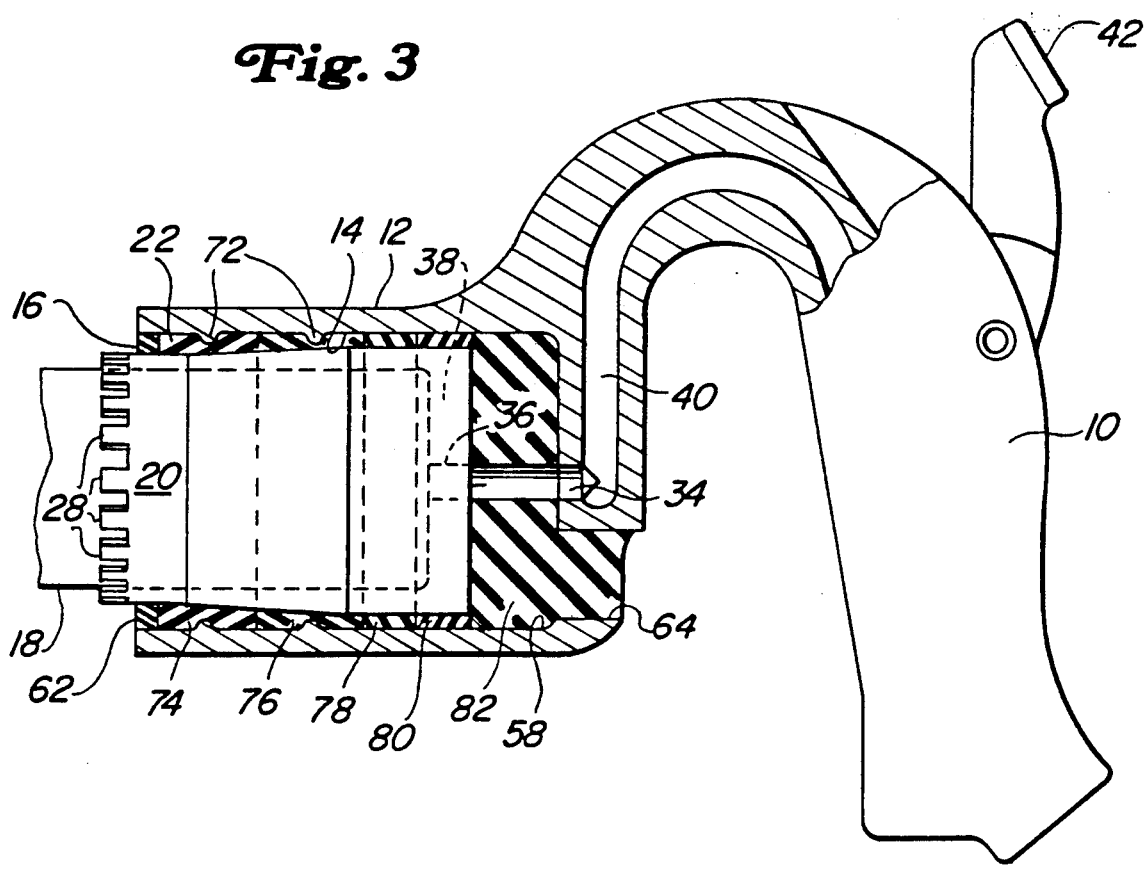
FIG. 3 is a longitudinal section through the tool.
Figure 4:
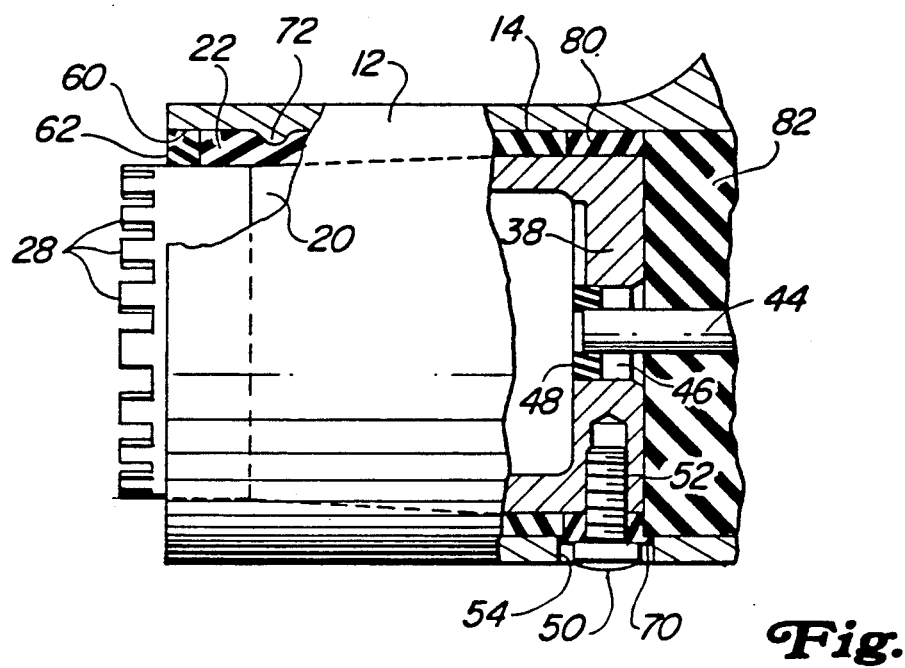
FIG. 4 is a fragmentary section of part of FIG. 3 but showing a different form of air-conducting passage means.

A lower rear part of the barrel is provided with an opening 64 that leads to the rear of the annular space 58 (FIG. 3). This opening is used for the introduction of the elastomer material into the cavity, after centering the cup as described above and further closing the front opening annular space at 60. It will be seen from FIG. 6 that the grommet 56 is shouldered at 66 and its height at the shoulder is less than the thickness of the associated portion of the barrel wall, thus leaving a cup-like space 68. After the annular space 58 is filled by elastomer material, some material fills the spaces 68 to the extent permitted by the configuration of the grommets, as at 70 (FIG. 4), thus establishing an interlock with the barrel wall when the grommets are removed and the cap screws subsequently replaced after the elastomer sets up. Thus, although the caps screws are or may be of rigid material (e.g., steel, brass, etc.) and are screwed into the rigid cup 20, the outer ends of the screws are isolated from the barrel wall and thus from the handle 10 because of the elastomer at 70. As further augmenting an interlock between the barrel and the elastomer, the interior wall of the barrel has several annular ribs 72 integral therewith (FIGS. 2, 3 and 4).

As noted above herein, the elastomer is introduced and sets up in laminar or layered form. This is best seen in FIG. 3. For purposes of clarity it will be assumed that during the pouring phase, the barrel and initially assembled or located cup will occupy a position in which the axis of the barrel and cup is upright, with the front of the barrel down and the opening 60 suitably closed; further the pour opening 64 will be at the top of the thus oriented structure. The caps screws 50 and their grommets are in place. In the case of the passage means of FIG. 4, the tube 44 serves as a further cup locator. At this stage, a first layer of elastomer is introduced to form a layer 74, which is allowed to set up to an extent enabling introduction of successive layers or rings 76, 78, 80 and 82, the layers ultimately bonding to each other and to the walls of the barrel and cup. As stated above, portions of the last layer enter parts of the barrel wall openings 54 to provide elastomer at 70. The now-filled opening 64 also serves as a vibration release.

In the present form of the invention, not all layers are of the same Shore A hardness. For example, the hardness of the first ring or layer 74 is greater than that of the second ring 76, the hardness of the first ring being in the Shore A range of forty to fifty and that of the second ring in the range of twenty to thirty. Further, the third ring may have the same hardness as the first, as may the fifth, with the second and fourth being of the same hardness. Still further, the layers are preferably of different axial lengths (measured horizontally). For example, given a total length of elastomer of four inches from front to rear (again in the horizontal sense), the first and second layers have axial lengths of one inch while the axial length of each of the third and fourth rings is one-half inch, with the last ring thicker than the third and fourth rings. Stated otherwise, the first and second rings have about twice the length of the third and fourth. The lengths will vary of course according to the radial thickness of the rings in other situations, as with an annular space like 58 of increased or decreased dimension.

In the case of a chipper tool, the major forces are axial or fore and aft, mainly rearward thrusts, which are taken up by the rings which are of course bonded to each other as well as to the cup and barrel surfaces, augmented by the ribs 72 within the barrel. The last layer 82 backs up the cup rearwall 38. The cap screws as interlock elements function to accommodate thrust forces as well as twisting or angular forces, it being recalled in this area that the elastomer at 70 isolates the cap screws from the barrel.

Features and advantages other than those enumerated will occur to those versed in the art, as will many modifications and alterations in the preferred structure disclosed, all without departure from the spirit and scope of the invention.

I claim:

1. A portable, powered hand-held tool of the type generating vibration during operation and having a rigid handle for association with a separate, rigid fore-and-aft work member including a rear part adjacent to the handle and wherein the handle has a fore part providing a rigid, generally cylindrical wall on a fore-and-aft axis and defining a cavity having a front opening, a hollow, cylindrical work-member-receiving cup of rigid material coaxially disposed within the cavity and having an annular wall including an outer surface of a diameter less than that of the handle wall and combining with the handle wall to provide an annular space, and vibration-isolating material contained within the annular space and locking the cup to and within the handle wall, characterized in that a rigid interlock element traverses at least part of the annular space and is embedded in at least part of the vibration-isolating material and has first and second opposite end portions, said first end portion being connected to the cup and the second end portion projecting into the wall, said wall having an opening therein exposed to the aforesaid annular space and of greater diameter than the element so as to provide a space surrounding the second end portion of the element, and said vibration-isolating material permanently filling the said last named space and adhered to the interior periphery of the wall opening and tightly surrounding the second end portion of the element.

2. The tool according to claim 1, further characterized in that there are a plurality of such elements extending radially between the member and the wall.

3. The tool according to claim 2, in which the elements lie in the same radial plane.

4. The tool according to claim 1, further characterized in that the cup has a rear radial wall having a fore-and-aft passage means therethrough, the tool is air-powered and has an air-conducting conduit communicating with the passage means, the passage means including a fore-and-aft bore through the rear wall, a tube coaxially through the bore, and an air-tight seal concentric with and sealing the tube within the bore.

* * * * *

UNITED STATES PATENT AND TRADEMARK OFFICE
CERTIFICATE OF CORRECTION

PATENT NO. : 5,054,562

DATED : 10-8-91

INVENTOR(S) : Thomas S. Honsa and Thomas W. Honsa

It is certified that error appears in the above-identified patent and that said Letters Patent is hereby corrected as shown below:

At Column 1, Line 34 after "elastomer" insert --material in layer form of different Shore A hardnesses--. At Column 2, Line 5 after "tool" insert --, riveter--.

Signed and Sealed this

Ninth Day of February, 1993

Attest:

STEPHEN G. KUNIN

Attesting Officer

Acting Commissioner of Patents and Trademarks